3,406,187
ALKALI METAL AZIDE COMPLEXES OF ORGANO-ALUMINUM COMPOUNDS AND USES THEREOF
Wolf Rainer Kroll, 715 Clark St., Linden, N.J. 07036
Continuation-in-part of applications Ser. No. 92,254, Feb. 28, 1961, and Ser. No. 95,473 and Ser. No. 95,474, Mar. 14, 1961. This application Sept. 30, 1964, Ser. No. 411,171
Claims priority, application Germany, Mar. 15, 1960, Z 7,877, Z 7,878
42 Claims. (Cl. 260—349)

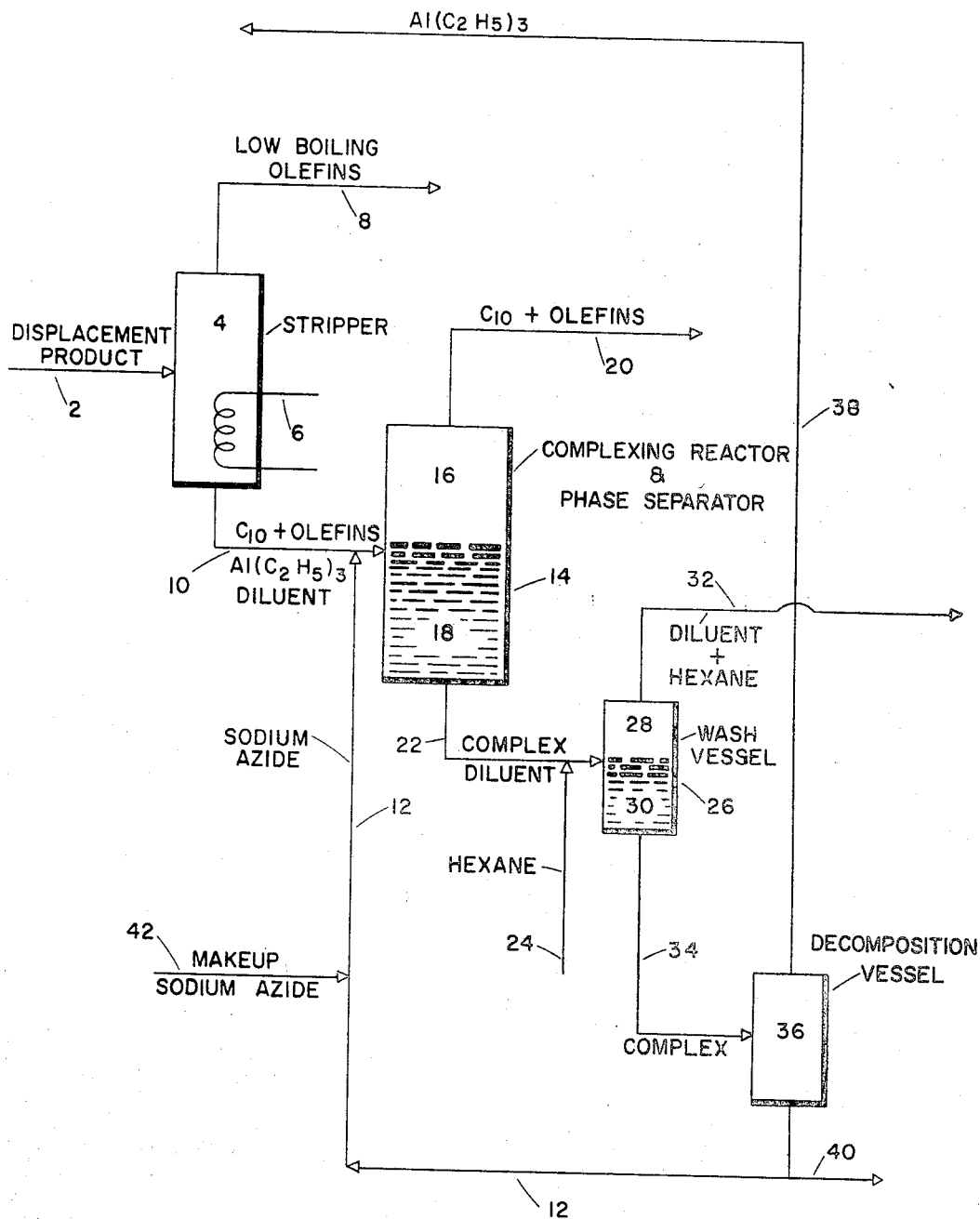

ABSTRACT OF THE DISCLOSURE

There is disclosed novel processes for preparing alpha-olefins containing at least 3 carbon atoms from a low molecular weight mono-olefin reacted with an aluminum compound ($AlR_3$, $AlR_2OR' + AlR_3$ or $AlR_2SR' + AlR_3$), to provide a growth product, the growth product is converted into a displacement product by treatment with a metal reducing catalyst and further mono-olefin; and thereafter the displacement product is contacted with an alkali metal azide complexing agent which reacts therewith to complex substantially all of the $AlR_3$ in the displacement product and provide the desired alpha-olefins.

As can be appreciated, the aforesaid process can be adapted for the separation of trialkyl aluminum from other organic compounds and for the separation of alpha-olefins from its mixtures with other organic compounds.

Further, the complexes of alkali metal azides with aluminum trihydrocarbons ($nAlR_3 \cdot MeN_3$; Me is an alkali metal and $n$ is a number having a value of from about 1 to about 2.1) constitute novel materials which can be used (supra) for the separation of aluminum trialkyls from mixtures thereof with other materials, etc.

---

This application is a consolidation of applications Ser. Nos. 92,254, filed Feb. 28, 1961, 95,473, filed Mar. 14, 1961, and 95,474, filed Mar. 14, 1961, all of which are now abandoned.

This invention relates to a method for the separation of aluminum alkyls from their mixtures with organic compounds. In one aspect, it relates to a process for the recovery of alpha-olefins from their mixtures with tri-alkyl-aluminums. In another aspect, it relates to novel compositions employed in the separation process.

Heretofore, several methods have been proposed for the production of higher olefins from lower olefins. In general, these proposed methods have involved the reaction of a trialkyl-aluminum compound with a lower olefin, specifically, ethylene to form the so-called growth product. After forming the growth product, it is heated in the presence of an additional quantity of ethylene and a finely divided metal catalyst, such as finely divided nickel, whereby the higher alkyls linked to aluminum are split off as higher alpha-olefins thereby forming aluminum triethyl or tripropyl, i.e., the so-called displacement reaction. Finally, the higher olefin is recovered from the reaction mass by distillation. The growth reaction may be illustrated equation-wise as follows:

(1)
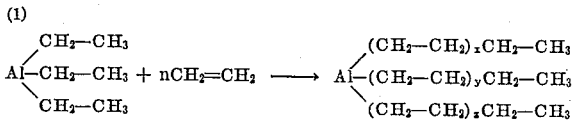

wherein $x$, $y$, and $z$ represent integers ranging from 0–14 (average 3–7) and $x+y+z=n$.

The foregoing reaction may be carried out by passing ethylene through triethyl-aluminum, preferably in the presence of a diluent under a wide variety of reaction conditions, e.g., 65°–150° C. and 200–5,000 p.s.i.g., preferably 90°–120° C. and 1,000–3,500 p.s.i.g. It is to be understood that, instead of employing triethyl-aluminum as the starting trialkyl-aluminum in the above reaction, other low molecular weight alkyl ($C_2$–$C_4$) aluminum compounds, such as tripropyl-aluminum, tributyl-aluminum, triisobutyl-aluminum, diethyl-aluminum hydride, ethyl-aluminum dihydride, etc., may be employed; and in lieu of ethylene, other low molecular weight aliphatic mono-1-olefins, such as propylene and the like may be substituted. Generally, $C_2$–$C_4$ olefins are preferred as the growth hydrocarbon compound.

The higher olefins are produced by heating growth product, usually at a temperature from about 50 to about 150° C. for 1 to 30 minutes in the presence of an additional quantity of ethylene and a catalyst, this process being known as the displacement reaction. The displacement reaction can be illustrated equationwise as follows:

(2) 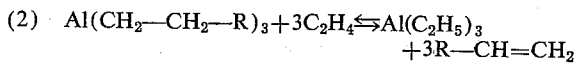

wherein $R=H$, $C_2H_5$, $C_4H_9$, $C_6H_{13}$, etc.

It has been suggested that the alpha-olefins and the triethyl-aluminum produced in the displacement reaction can be recovered by fractional distillation. It has been suggested further that, after the separation of the triethyl-aluminum and the alpha-olefins, the triethyl-aluminum can be returned to the growth reaction and the alpha-olefins to storage. The actual process, however, is not as simple as Equation 2 indicates. This is true, because the triethyl-aluminum and the alpha-olefins contained in the displacement products tend to undergo a reverse displacement reaction; and for that reason Equation 2 is written as a reversible reaction. Furthermore, under the conditions present, there is a tendency for the alpha-olefins to isomerize at atmospheric pressure. Investigations have demonstrated, conclusively, that the reverse displacement reaction and the tendency of the alpha-olefins to isomerize are both accelerated by the catalyst employed in the initial reaction.

In addition to the process difficulties outlined above, considerable difficulty is encountered in the separation of the different reaction or displacement components from each other by distillation. It has been found that, when triethyl-aluminum is reacted with ethylene and the resulting growth product is subjected to the displacement reaction, the reaction product will comprise in addition to the solvent the following components listed in order of ascending boiling points:

Ethylene
Butene-1
Hexene-1
Octene-1
Decene-1
Dodecene-1
Aluminum-triethyl
Tetradecene-1
Hexadecene-1
Octadecene-1
Eicosene-1
Higher olefins; unreacted $AlR_3$ As a specific example, it is impractical to separate triethyl-aluminum from dodecene-1 by ordinary methods of fractional distillation because the boiling points of the aluminum triethyl and dodecene are very close.

It is, therefore, a principal object of the present invention to provide a process for the separation of trialkyl-aluminum from other organic compounds.

It is another object of this invention to provide a process whereby alpha-olefins containing at least 3 carbon atoms can be produced from ethylene by a process which is economical and simple to operate.

Still another object of this invention is to provide a process whereby the alpha-olefins can be readily separated from the other components.

Yet another object of this invention is to provide novel compositions of matter for use in the separation of alpha-olefins from other products of the displacement reaction.

Yet another object of this invention is to provide novel aluminum-organic complex compounds.

Other objects and advantages of the invention will be apparent as the description proceeds.

To the accomplishment of the foregoing and related ends, this invention comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects are realized broadly by adding to an admixture of trialkyl-aluminum and other organic compound, an alkali metal azide to form a complex of said azide with said trialkyl-aluminum, and separating said complex from said organic compound.

In one aspect of the invention the product of a displacement reaction comprising trialkyl-aluminum and alpha-olefins is reacted with an alkali metal azide to form a complex of said azide with trialkyl-aluminum and said complex is separated from the alpha-olefins.

In another aspect of the invention, the complex which is formed between the complexing agent and trialkyl-alumimun compound is heated to release the trialkyl-aluminum compound, said compound being reused in the growth reaction and the complexing agent being recycled for reuse in the treatment of the displacement product.

In still another aspect, the invention comprises as new compositions of matter complexes of alkali metal azides with aluminum trihydrocarbons.

The novel azide aluminum hydrocarbon complexes have the general formula $nAlR_3 \cdot 1MeN_3$ in which R is any alkyl, aryl, alkylaryl, or aralkyl radical, $n$ is a number substantially between about 1 and about 2.1 and in which Me is an alkali metal. R as alkyl may have any desired chain length.

The novel complex compounds and particularly those liquids at room temperature exhibit relatively high thermal stability and may be even handled at elevated temperatures. At high temperatures, especially under vacuum, they can be split into their components. If several complex compounds exist between an alkali metal azide and, for instance, an aluminum alkyl, this cleavage takes place stepwise in such manner that the higher complex compounds, as for example the 1:2 sodium azide-aluminum triethyl compound, may be first split into the lower, i.e., the 1:1.76 compound which may be, in turn, split into the pure components.

The azide complexes are difficulty soluble in non-aromatic hydrocarbons and, if substantially liquid, are immiscible with hydrocarbons. For example, they do not dissolve in aliphatic hydrocarbons, cyclohexane or in liquid olefins. Due to this poor solubility or immiscibility, the novel complex compounds can be used for the separation of aluminum trialkyls from mixtures thereof with other materials.

The higher azide complexes dissociate in suitable solvents into the lower azide complex and free aluminum hydrocarbon, such as aluminum trialkyl. Thus, solvent dissociation into, for instance, aluminum trialkyl and sodium azide occurs when the ratio is below that of sodium to aluminum of the lower azide complex. This dissociation can be used to decompose, by extraction, a higher azide complex into a lower one or even to decompose the lower azide complex into, for instance, sodium azide and aluminum trialkyl.

If the aluminum hydrocarbon is liquid at the complexing temperature, a solvent is ordinarily not required for the complexing reaction. A solvent may be used, however, if desired, as for instance, for diluent purposes. If the aluminum hydrocarbon is, however, substantially solid at the desired complexing temperature which is true, for instance, for components with relatively long alkyl chains, the use of a solvent for either the azide or the aluminum hydrocarbon, or for both, may be necessary. Aromatic or aliphatic hydrocarbons are usable for this purpose. In that case, if the solvent has a dissociating action upon the complex to be formed, the conditions, such as concentrations and/or temperature, should be so selected and maintained that dissociation is suppressed or kept at a minimum.

In accordance with one embodiment of the invention, the lower olefins up to and including $C_{10}$ are separated under vacuum before the formation of the complex by passing the displacement product through a film evaporator.

In another embodiment, the lower olefins up to and including $C_{10}$ are separated in a film evaporator followed by separation of a dodecene aluminum triethyl fraction and then of the aluminum-free higher olefins. In this embodiment, only the dodecene-aluminum triethyl fraction is treated with alkali metal azides.

Suitable catalysts for use in the displacement reaction include the so-called reduction catalysts, such as nickel, cobalt, palladium, and certain iron compounds. The preferred catalyst is nickel or a nickel compound, which will react with the trialkyl-aluminum compound. As second choice, the catalyst is cobalt. Specific nickel catalysts include finely divided metallic nickel, Raney nickel, nickel acetylacetonate, nickel naphthenate, etc. Karl Ziegler has designated such catalysts in his work on this subject, broadly, as "colloidal" nickel catalysts. The amount of catalyst used can be varied greatly; however, usually the catalyst is employed in amounts from about 0.001 to 0.1 percent based upon the weight of the growth product present.

The azides suitable for use as complexing agents are the alkali metal azides, especially sodium and potassium azides. Lithium azide is, of course, suitable. The alkali azides form complex compounds with aluminum alkyls, -aryls, -aralkyls and -alkylaryls. Preferred are, however, aluminum alkyls and particularly those which are substantially liquid at ordinary temperatures (usually up to about an average $C_{12-14}$). Particularly, advantageous complexing is obtained with aluminum alkyls having lower alkyl chains yielding substantially liquid complex azides as they permit liquid phase operation. Illustrative examples are the alkali and preferably sodium and potassium azides formed with aluminum trimethyl, aluminum triethyl, aluminum tripropyl, and aluminum triisobutyl.

It has been found that the azide reacts with the triethyl-aluminum substantially according to the following equations:

(3) 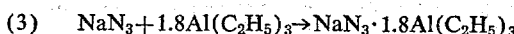$NaN_3 + 1.8Al(C_2H_5)_3 \rightarrow NaN_3 \cdot 1.8Al(C_2H_5)_3$ (4) 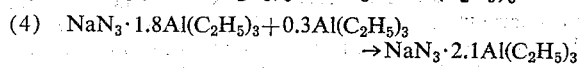$NaN_3 \cdot 1.8Al(C_2H_5)_3 + 0.3Al(C_2H_5)_3$
$\rightarrow NaN_3 \cdot 2.1Al(C_2H_5)_3$ The amount of the alkali metal azide used in the process should be sufficient to react with all of the triethyl-aluminum present as in Equation 3 or when the alkali metal azide-triethylaluminum complex is used the amount of complex to be added is determined from Equation 4. Generally, it is preferred to use the theoretical amount as shown by the equations.

Formation of the alkali metal azide-trialkyl-aluminum complexes is usually effected at temperatures ranging from room temperature to about 150° C. In general, any temperature can be used, since the complexes are formed equally well at room temperature, as well as at more elevated temperatures. It is necessary, of course, that the temperature be maintained below the decomposition temperature of the complex. The time required to effect formation of the complex can vary widely but is usually from 1 to about 30 minutes. The complex compounds (azide-triethyl-aluminum complexes) and the alpha-olefins form separate layers, making it easy to remove the alpha-olefins by decanting, distillation or other similar means. If desired, the recovered alpha-olefins can be washed to remove any residual triethyl-aluminum that may be present in the recovered upper layer. Finally, the alpha-olefins can be subjected to fractional distillation. The complex salt can then be heated, bringing about its decomposition either to the 1.8:1 complex or to the alkali metal azide and the triethyl-aluminum. The thermal decomposition reactions can be illustrated as follows:

(5) $NaN_3 \cdot 2.1Al(C_2H_5)_3 \rightarrow 1.8Al(C_2H_5)_3$
$+0.3Al(C_2H_5)_3$ (6) $NaN_3 \cdot 1.8Al(C_2H_5)_3 \rightarrow 1.8Al(C_2H_5)_3 + NaN_3$ It has been found that there is a direct relationship between the temperature at which the complex is heated to bring about its decomposition and the pressure. Specifically, if the pressure varies from 0.5 to 500 mm. of mercury, a suitable temperature range varies from about 100 to 280° C. Generally, it is preferred to operate under a pressure varying from 5 to 10 mm. of mercury and a temperature varying from 130 to 180° C. As a rule, the temperature used is above the boiling point of the triethylaluminum at the particular pressure employed. Operating under such conditions makes it possible to remove the triethyl-aluminum as it is released from the complex causing the reaction to go to completion.

From Equation 2, it will be seen that 3 mols of ethylene per mol of growth product is used. This, however, is the minimum, and as a rule an excess of ethylene is used. Under normal operating conditions, the reaction is generally carried out so that the process is maintained under an ethylene pressure of 20 to 100 atmospheres.

In addition to the procedure hereinbefore described, higher olefins can also be prepared from lower olefins through the reaction of an aluminum compound having the formula:

$$AlR_2OR'$$

with a lower olefin. This is accomplished by forming a growth product and displacing higher olefins from said growth product in the presence of additional lower olefin and a catalyst system comprising a reducing metal and an alkyl-aluminum compound. When utilizing the alkoxy aluminum compound, the growth reaction takes place as follows:

(7)

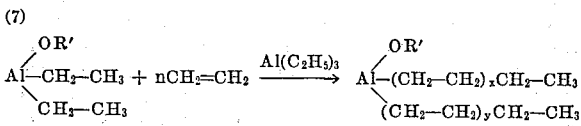

wherein $x$ and $y$ are defined as in reaction (1), R' is a hydrocarbon group which can be alkyl, cycloalkyl, aryl, alkaryl, aralkyl, etc.

The higher olefins are produced by heating the growth product, under conditions of temperature and time as previously set forth, which process is known as the displacement reaction. This reaction can be illustrated equationwise as follows:

(8) $Al(CH_2\text{---}CH_2R)_2OR' + 2C_2H_4 \rightleftharpoons$
$Al(C_2H_5)_2OR' + 2R\text{---}CH=CH_2$ wherein R equals H, $C_2H_5$, $C_4H_9$, $C_6H_{13}$, etc. As before, alkali metal azide can be employed to complex with the trialkyl-aluminum, thereby aiding in the separation and recovery of the alpha-olefin product. When the alkali metal azide is employed to complex the trialkyl-aluminum, the complex may form a separate lower layer from the olefins and alkoxy aluminum compound, depending on the particular solvent in which the reaction is carried out and also on the composition of the alkoxy compound. Various methods can be employed in recovering the alpha-olefins from the reaction product and complex mixture. For example, the olefins can be distilled until the boiling point of the alkoxy compound is reached, after which this compound can also be removed by distillation following which the complex can be decomposed, with recycling and reuse of the decomposed products as hereinbefore set forth. When the complex forms a separate lower layer, the alkoxy aluminum compound and olefins can be separated from the complex layer by decantation, with the complex being decomposed separately and the alkoxy compound and olefins being separated by distillation. In another variation of the recovery procedure, the olefins are distilled, followed by decomposition of the complex and finally distillation of the alkoxy compound. Each of the foregoing procedures find application by the appropriate choice of the OR' group to provide an alkoxy compound having the desired boiling point.

It is also within the scope of the invention to employ in place of the aluminum alkoxy compounds materials having the formula:

$$AlR_2SR'$$

wherein R and R' are defined as previously set forth.

A further understanding of the present invention will be obtained from the following examples which are intended to be illustrative but not limitative of the invention and the scope thereof.

Example 1

21 grams (0.323 mol) of sodium azide (dried) were reacted with 59 grams (0.518 mol) of aluminum triethyl with stirring at room temperature. Most of the sodium azide reacted at room temperature. To provide reaction of additional sodium azide, the mixture was warmed up to 80° for a few hours. After cooling down and settling, the liquid was decanted and analyzed; aluminum: 17.85 percent; sodium 8.64 percent; ratio of sodium to aluminum in the complex 1:1.76. About 1.7 grams of sodium azide were regained. The complex was treated two times with the same volume of dodecene at room temperatures. After the last extraction, the top dodecene layer contained 1.14 percent aluminum and smaller than .01 percent sodium, representing 6 percent of the total aluminum of the complex and 0.001 percent of the total sodium. The extremely low sodium value establishes that a dissociation of the complex compound takes place.

Example 2

15.5 grams (0.238 mol) of sodium azide were reacted with 83.5 grams (0.732 mol) of aluminum triethyl at room temperature. Most of the solid disappeared at room temperature, and two liquid layers could be observed. In order to complete the reaction, the mixture was warmed up to 80° for several hours. The bottom layer was separated and analyzed. It had an aluminum value of 18.8 percent and a sodium value of 7.5 percent. The ratio of sodium to aluminum was 1:2.1. After extensive washing with hexane and removal of solvent, the analysis showed: 17.95 percent aluminum, 8.5 percent sodium, that is, a sodium-aluminum ratio of 1:1.81. This shows that the "higher azide complex" is decomposed by extraction to the "lower azide complex."

Example 3

24 grams of the lower azide complex of Example 2 were decomposed by heating for an hour at 90–108° C. at 0.8–0.7 mm. The reaction mixture got viscous and was impossible to stir at the end. At that time, the decomposition was stopped: 16 grams of distillate were collected and 8 grams of residue. The distillate had practically the theoretical aluminum value for aluminum triethyl. The residue was washed with xylene and later with hexane. After extensive drying, 4.9 grams of sodium azide were recovered which amounts to 87 percent decomposition of the complex by heating.

Example 4

73 grams of 1:2 sodium azide aluminum triethyl complex were extracted with hexane in an apparatus which was suited for the extraction of liquids, e.g., a Schacherl extractor. In doing so, the volume of the lower phase in the extractor was continuously reduced, and solid sodium azide was precipitated in this bottom phase after some time. Care was taken that the solid particles of the precipitated sodium azide were not entrained by the rising extracting agent, which was easily achieved by suitably controlling the extraction velocity. The test was terminated when the liquid lower layer had completely disappeared and only sodium azide was still suspended in the hexane. The liquid flow was adjusted such that the solid deposit was slightly whirled high in the lower part of the extraction vessel at the end of the extraction, but nevertheless clear solvent ran off at the top. The duration of the procedure was dependent upon the velocity at which the hexane boiled in the boiling flask of the extraction apparatus. In general, a reaction period of between 10 and 24 hours was sufficient. However, this period could be shortened by suitable measures.

After having distilled off the hexane, pure aluminum triethyl in amount of 57 grams was left in the boiling flask of the extractor.

Example 5

33 grams of sodium azide which previously had been thoroughly dried were mixed with 163 grams of aluminum-tri-n-propyl while stirring. In doing so, complexing commenced at room temperature. Complexing could be rapidly completed by stirring and heating at 50° C., i.e., substantially all of the sodium azide was dissolved. The complex remained liquid even after it had been cooled down. It formed a second phase with additional aluminum tripropyl.

Example 6

27 grams of potassium azide (dry) were reacted with 39 grams of aluminum triethyl. In doing so, heating without gas evolution was observed. When heating to 65° C. (still more rapidly when heating up to 120° C.) and vigorously stirring, a clear solution was obtained which, after cooling, got viscous at room temperature and from which several crystals were only separated when allowed to stand for an extended period of time. The viscous liquid had exactly the composition $$KN_3 \cdot Al(C_2H_5)_3$$

To this mixture were added further 39 grams of aluminum triethyl, which again resulted in heating up. After heating to about 70° C., a single clear phase was obtained which got viscous after cooling. This 2:1 complex was found to be insoluble in additional aluminum triethyl and sparingly soluble in n-hexane.

Example 7

4 grams of sodium azide were stirred with 35 grams of aluminum tri-isobutyl (i.e., more than required for the formation of the 1:2 sodium azide-triisobutyl aluminum complex) and heated up to 70° C. In doing so, the sodium azide was completely dissolved. After cooling, the formation of a second phase was not observed. This means that the 1:2 complex formed is soluble in an excess of aluminum tri-isobutyl.

Example 8

In a ball mill as described in Liebigs Annalen, 589, (1954), 110, 65 grams of thoroughly dried sodium azide were extensively wet-ground under a protective gas atmosphere (nitrogen or argon) with 145 grams of aluminum trimethyl and 200 ml. of dry octane. From time to time, the mixture was allowed to settle and a sample of the supernatant octane was taken to determine its aluminum content. The reaction was completed as soon as the aluminum value had dropped to a very low constant value. The suspension of the solid complex formed was discharged and allowed to settle. The supernatant solvent was poured off and the octane was evaporated from the remaining slurry under vacuum at 50 to 60° C. The complex $NaN_3 \cdot 2Al(CH_3)_3$ was obtained as a white powder.

Example 9

A growth product was prepared by reacting aluminum triethyl with ethylene at 150 atmospheres and 120° C. 1330 grams of the growth product having an average composition of $Al((C_2H_4)_{3.6}C_2H_5)_3$ were mixed with 0.1 gram of nickel acetyl acetonate and then converted in known manner with ethylene into 1470 grams of a reaction product which contained 265 grams of aluminum triethyl in addition to olefins. This growth product containing the nickel catalyst was displaced in a continuously operating apparatus with an excess of ethylene (50 atmospheres) at 105° C. The displacement product (1470 grams) which contained 265 grams of aluminum triethyl was stirred with 76 grams of sodium azide at room temperature under a slight superatmospheric pressure of ethylene. Two liquid layers were formed. The bottom layer (341 grams) represented the 1:2 sodium azide-triethyl complex. The top layer was removed by siphoning. It contained only traces of aluminum-organic compound and consisted of alpha-olefins having a purity in excess of 98%.

Example 10

A mixture of 456 grams of aluminum triethyl and 323 grams of tetraethyl lead which, for example, might be obtained by electrolysis was stirred with 130 grams of dry sodium azide. Complexing between the sodium azide and aluminum triethyl commenced already at room temperature. It was completed if the interface of the two liquid phases did no longer shift. The upper liquid phase then consisted of the 1:2 sodium azide-triethyl complex and the bottom phase consisted of almost pure tetraethyl lead. The two liquid phases could be separated conveniently by siphoning.

Example 11

Decomposition of a low azide complex having a ratio of sodium to aluminum as 1:1.82. 24 grams of this complex were decomposed for 1 hour under a vacuum of 0.8 mm. Hg and at 100° C. The reaction mixture got viscous and it was impossible to stir at the end. 16 grams distillate and 24 grams residue were collected. The distillate was practically pure aluminum triethyl, which was proved by analysis. The residue was washed with xylene and later with hexane. After extensive drying, 4.9 grams sodium azide were recovered, which corresponded to an 87% decomposition.

In order to more clearly describe the invention and provide a better understanding thereof, reference is had to the accompanying drawing which is a diagrammatic illustration of an extractive distillation system suitable for carrying out the invention.

Referring to the drawing, displacement product comprising a mixture of alpha-olefins and aluminum triethyl was introduced to stripper 4 through conduit 2. Within the stripper, which was heated by reboiler 4, separation was effected whereby low boiling olefins ($C_9$ and lower) were removed from the displacement product, being withdrawn as stripper overhead through conduit 8. The remainder of the displacement product comprising $C_{10}+$ olefins, aluminum triethyl, and reaction diluent was withdrawn from the stripper through conduit 10, combined with sodium azide through conduit 12 and introduced to a complexing reactor and phase separator 14. The latter vessel was maintained under suitable temperature and pressure whereby the sodium azide complexed with the triethyl-aluminum. As a result of this reaction, two phases were formed in vessel 14, an upper phase 16 comprising principally $C_{10}+$ olefins and a lower phase 18 comprising sodium azide-triethyl-aluminum complex and diluent. The upper phase was withdrawn from vessel 14 through conduit 20, and the complex and diluent were withdrawn through conduit 22, combined with wash hexane through conduit 24 and introduced to wash vessel 26. In the wash vessel, a mixture of hexane and diluent separated from the complex to form an upper phase 28 which was withdrawn from the wash vessel through conduit 32. The complex, which accumulated as a separate phase 30 in the bottom of the wash vessel, was removed through conduit 34 and introduced to decomposition vessel 36 wherein an elevated temperature was maintained, sufficient to decompose the complex. In vessel 36 aluminum triethyl was distilled from the complex, leaving a residue of sodium azide and undecomposed lower azide complex. Heat required for decomposition in vessel 36 was provided by a reboiler (not shown). Aluminum triethyl was withdrawn from vessel 36 through conduit 38, and, as desired, could be recycled for reuse in the growth or displacement reactions. Heated complexing agent was withdrawn from the decomposition vessel through conduit 40. If desired, this material could be returned to the complexing reactor and phase separator through conduit 12.

During the preceding process, losses of complexing agent from the system can occur, and make-up material was therefore provided through conduit 42 as required.

The following example is presented in illustration of an application of the invention on a commercial scale, as embodied in the aforedescribed drawing:

Example 12

| | Wt. percent | Pounds per hour |
|---|---|---|
| Flows: | | |
| Displacement product to stripper (2) | | 100 |
| Composition: | | |
| $C_2$ to $C_{30}$ olefins | 65.1 | |
| $Al(C_2H_5)_3$ | 17.3 | |
| Diluent (isooctane) | 17.6 | |
| Stripper bottoms to reactor (10) | | 63.7 |
| Composition: | | |
| $C_{10}$ to $C_{30}$ olefins | 72.8 | |
| $Al(C_2H_5)_3$ | 27.2 | |
| Sodium azide to reactor (12) | | 5.5 |
| Complex to wash vessel (22) | | 21.9 |
| Composition: | | |
| $NaN_3 \cdot 1.8Al(C_2H_5)_3$ | 98.1 | |
| $NaN_3$ | 1.4 | |
| $C_{10}$ to $C_{30}$ olefins | 0.5 | |
| Hexane to wash vessel (24) | | 21.5 |
| Complex to decomposition vessel (34) | | 21.8 |
| Composition: | | |
| $NaN_3 \cdot 1.8Al(C_2H_5)_3$ | 98.6 | |
| $NaN_3$ | 1.4 | |
| Temperatures: | | ° C. |
| Stripper (4): | | |
| Top | | 0 |
| Bottom | | 100 |
| Complexing reactor and phase separator (14) | | 80 |
| Wash vessel (26) | | 25 |
| Decomposition vessel (36) | | 100 |
| Pressures: | | Mm. Hg. |
| Stripper (4) | | 20 |
| Complexing reactor and phase separator (14) | | 760 |
| Wash vessel (26) | | 760 |
| Decomposition vessel (36) | | 0.8 |

While the invention finds particular application in the separation of alpha-olefins from trialkyl-aluminums, it is within the scope of the invention broadly to separate aluminum alkyls from other organic compounds, particularly when said other compounds are not readily separated by conventional methods. For example, the process of this invention can be employed to separate mixtures of aluminum alkyls from other metal alkyls such as lead tetralkyls, and the like.

While particular embodiments of the invention have been described, it will be understood, of course, that the invention is not limited thereto, since many modifications may be made; and it is, therefore, contemplated to cover by the appended claims any such modifications as fall within the true spirit and scope of the invention. As will be apparent to those skilled in the art, the invention is applicable to the production of even-numbered and odd-numbered and straight-chain and branched-chain alpha-olefins. Even numbered alpha-olefins are produced when triethyl-aluminum is reacted with ethylene after which the resulting growth product is treated in accordance with my invention. Odd-numbered alpha-olefins are produced when tripropyl-aluminum is substituted for triethyl-aluminum in the reaction. Variations in procedure which can be used within the scope of the invention include stripping the mixture of alpha-olefins and trialkyl-aluminum to remove lower olefins up to about $C_{10}$, complexing the trialkyl-aluminum with the alkali metal azide, separating the two layers thereafter formed by decantation, heating the bottom layer (complex) to decompose the complex and thereafter recycling the decomposition products for reuse in the process. In another procedure, stripping and formation of the complex is again carried out as above, with the distinction that the lower metal azide complex is reacted with the trialkyl-aluminum rather than the metal azide. In this procedure, after the separation by decantation, the higher complex is decomposed to the lower complex which is then recycled to the process. In still another procedure, displacement product is distilled into three fractions, a lower olefin fraction and aluminum trialkyl plus dodecene fraction, and a residue of high boiling olefins. In this method, only the intermediate product is complexed. In still another procedure, the azide complexes instead of being thermally decomposed are extracted with a suitable solvent, for example, an aliphatic or aromatic hydrocarbon by continuous extraction.

It is also within the scope of the invention to prepare 1.8:1 azide complex from the 2.1:1 complex in accordance with the following reaction:

(9) $18NaN_3 \cdot 2.1Al(C_2H_5)_3 + 3NaN_3 \rightarrow$
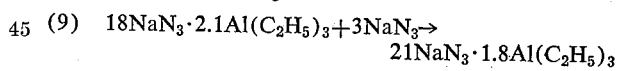
$21NaN_3 \cdot 1.8Al(C_2H_5)_3$ The complex compounds of the alkali metal azides and trialkyl-aluminum provide a number of advantages in the process of this invention. Under the conditions of the process, the complexes are liquid and thus are easily handled. They possess the further advantages that they are formed at room temperature and are easily decomposed, thus allowing reuse of the individual components of the complexes in the preceding process steps. Due to their high conductivities the complexes also have utility for uses where this property is important, for example, in the manufacture of lead alkyls by the electrolytic process.

As pointed out previously, the products of the displacement reaction tend to undergo a reverse displacement reaction, and further there is a tendency for the alpha-olefins to isomerize, both of these conditions being accelerated by the catalyst employed in the displacement reaction. It has been found that various materials can be employed which exert a poisoning or inhibiting effect on the catalyst, thereby minimizing the reverse displacement reaction and also the tendency of the alpha-olefins to isomerize. For example, it has been found that the alkali metal cyanides, particularly, sodium and potassium cyanides, are effective poisons for the catalyst. It has also been found possible to poison the catalyst by the addition of acetylenic compounds, such as phenyl acetylene, as described in German Patent No. 1,034,169 to Karl Ziegler. In addition, acetylene alcohols such as propargyl alcohol, can be employed as a catalyst poison. It is within the scope of the invention to employ any of these or any other catalyst poisons in the herein-described process, said poison being added to the displacement product prior to addition of the alkali metal azide complexing agent. Generally, only small amounts of the poison are required to effectively inhibit the undesired reactions. For example, when employing alkali metal cyanide, an amount from about 5 to 500 parts per part by weight of catalyst is generally used.

The invention having thus been described, what is claimed and desired to be secured by Letters Patent is:

I claim:

1. In a process for the preparation of alpha-olefins having a carbon content of at least three in which a material selected from the group consisting of $AlR_3$, $$AlR_2OR' + AlR_3$$

and $AlR_2SR' + AlR_3$, in which R is a low molecular weight alkyl group, R' is a hydrocarbon group and R and R' can be alike and unlike, is reacted with a low molecular weight aliphatic mono-1-olefin to provide a growth product, said growth product is heated in the presence of a metal reducing catalyst and an additional amount of said low molecular weight aliphatic mono-1-olefin to provide a displacement product, the improvement which comprises adding to said displacement product a complexing agent comprising alkali metal azide in an amount sufficient to react with and form a complex with substantially all of the $AlR_3$ in said displacement product and recovering alpha-olefins from said complex.

2. The process of claim 1 in which the reducing catalyst is nickel, the material reacted with the low molecular weight aliphatic mono-1-olefin is triethyl-aluminum, said 1-olefin is ethylene and the complexing agent is selected from the group consisting of alkali metal azide and complex of alkali metal azide and $AlR_3$ in which the molecular ratio of said $AlR_3$ to said alkali metal azide is 1.8:1.

3. The process of claim 2 in which the alkali metal azide is sodium azide.

4. In a process for the preparation of alpha-olefins having a carbon content of at least three in which a material selected from the group consisting of $AlR_3$, $$AlR_2OR' + AlR_3$$

and $AlR_2SR' + AlR_3$, in which R is a low molecular weight alkyl group, R' is a hydrocarbon group and R and R' can be alike and unlike, is reacted with a low molecular weight aliphatic mono-1-olefin to provide a growth product, said growth product is heated in the presence of a metal reducing catalyst and an additional amount of said low molecular weight aliphatic mono-1-olefin to provide a displacement product, the improvement which comprises adding to said displacement product a compound selected from the group consisting of alkali metal azide and complex of alkali metal azide and $AlR_3$ in which the molecular ratio of said $AlR_3$ to said alkali metal azide is 1.8:1, said compound being present in an amount sufficient to react with and form a complex with substantially all of the $AlR_3$ present in said displacement product, allowing the resulting reaction product to separate into two layers, an upper layer comprising materials selected from the group consisting of alpha-olefins, $AlR_2OR'$+alpha-olefins, and $AlR_2SR'$+alpha-olefins, and the lower layer comprising alkali metal azide-$AlR_3$ complex wherein the molecular ratio of said $AlR_3$ to said alkali metal azide varies from 1.8:1 to 2.1:1, separating the upper layer and recovering the alpha-olefins therefrom.

5. The process of claim 4 in which the reducing catalyst is nickel, the alkali metal azide is sodium azide, the material reacted with the low molecular weight aliphatic mono-1-olefin is triethyl-aluminum and said 1-olefin is ethylene.

6. In a process for the preparation of alpha-olefins having a carbon content of at least three in which a trialkyl-aluminum compound is reacted with a low molecular weight aliphatic mono-1-olefin to provide a growth product, said growth product is heated in the presence of a metal reducing catalyst and an additional amount of said low molecular weight aliphatic mono-1-olefin to provide a displacement product, the improvement which comprises adding to said displacement product a compound selected from the group consisting of alkali metal azide and complex of alkali metal azide and $AlR_3$ in which the molecular ratio of said $AlR_3$ to said alkali metal azide is 1.8:1, said compound being present in an amount sufficient to react with substantially all of the $AlR_3$, allowing the resulting reaction product to separate into two layers, an upper layer comprising the alpha-olefins and the lower layer comprising alkali metal azide-$AlR_3$ complex wherein the molecular ratio of said $AlR_3$ to said alkali metal azide varies from 1.8:1 to 2.1:1, separating the upper layer and recovering the alpha-olefins therefrom, heating said lower layer to decompose at least a portion of said alkali metal azide-$AlR_3$ complex, separating released $AlR_3$ compound and returning said compound to the growth reaction and recycling undecomposed alkali metal azide-$AlR_3$ complex and alkali metal azide for reuse in the process.

7. The process of claim 6 in which the reducing catalyst is nickel, the alkali metal azide is sodium azide, the material reacted with the low molecular weight aliphatic mono-1-olefin is triethyl-aluminum and said 1-olefin is ethylene.

8. In a process for the preparation of alpha-olefins having a carbon content of at least three in which a trialkyl-aluminum compound is reacted with a low molecular weight aliphatic mono-1-olefin to provide a growth product, said growth product is heated in the presence of a metal reducing catalyst and an additional amount of said low molecular weight aliphatic mono-1-olefin to provide a displacement product, the improvement which comprises adding to said displacement product a compound selected from the group consisting of alkali metal azide and complex of alkali metal azide and $AlR_3$ in which the molecular ratio of said $AlR_3$ to said alkali metal azide is 1.8:1, said compound being present in an amount sufficient to react with and form a complex with substantially all of the $AlR_3$ present in said displacement product, allowing the resulting reaction product to separate into two layers, an upper layer comprising the alpha-olefins and the lower layer comprising alkali metal azide-$AlR_3$ complex wherein the molecular ratio of said $AlR_3$ to said alkali metal azide varies from 1.8:1 to 2.1:1, separating the upper layer and recovering the alpha-olefins therefrom, heating said lower layer to decompose said alkali metal azide-$AlR_3$ complex to release $AlR_3$ and form alkali metal azide and 1.8:1 complex of $AlR_3$ with alkali metal azide, separating released $AlR_3$ compound and returning said compound to the growth reaction and recycling alkali metal azide and said 1.8:1 complex for reuse in the process.

9. The process of claim 8 in which the reducing catalyst is nickel, the alkali metal azide is sodium azide, the material reacted with the low molecular weight aliphatic mono-1-olefin is triethyl-aluminum and said 1-olefin is ethylene.

10. A novel aluminum-organic complex compound of aluminum hydrocarbons and alkali azides having the general formula $nAlR_3 \cdot 1MeN_3$ wherein $n$ is a number of between 1 and 2.1, R is a hydrocarbon radical and Me is an alkali metal.

11. Novel compound according to claim 10 in which R is an alkyl radical.

12. Novel compound according to claim 10 in which R is a lower alkyl radical.

13. Novel compound having the general formula $$2Al(C_2H_5)_3 \cdot 1NaN_3$$

14. Novel compound having the general formula $$1.76\ Al(C_2H_5)_3 \cdot 1NaN_3$$

15. Novel compound according to claim 10 having the general formula $2Al(C_2H_5)_3 \cdot 1KN_3$.

16. A novel compound having the general formula $$1Al(C_2H_5)_3 \cdot 1KN_3$$

17. Process for producing novel aluminum-organic complex compounds which comprises reacting an alkali metal azide with an aluminum trihydrocarbon.

18. Process according to claim 17 in which said trihydrocarbon is a trialkyl.

19. Process according to claim 18 in which said reaction is effected in the presence of a solvent for at least one of the reactants.

20. Process according to claim 19, in which said reaction is effected by a temperature of between 50° and 120° C.

21. A novel aluminum organic compound consisting of a complex compound of aluminum trialkyl and alkali metal azide.

22. A method of separating aluminum trialkyls from mixtures thereof with organic compounds selected from the group consisting of olefins, boron alkyls and lead tetraalkyls, which comprises treating said mixtures with an alkali metal azide and separating the resultant complex compound of alkali metal azide and aluminum trialkyl.

23. The method of claim 22, wherein mixtures of aluminum trialkyls and olefins are separated.

24. A method of separating aluminum trialkyls from mixtures thereof with organic compounds selected from the group consisting of olefins, boron alkyls and lead tetraalkyls, which comprises treating a mixture of aluminum trialkyls and olefins derived from the treatment of higher aluminum trialkyls with lower olefins and comprising lower aluminum trialkyls and higher olefins with an alkali metal azide and separating the resultant complex compound of alkali metal azide and aluminum trialkyl.

25. The method of claim 22, wherein the complex compounds of alkali metal azides and aluminum trialkyls are separated from the rest of the organic compounds by formation of layers.

26. The method of claim 22, wherein said complex compounds of alkali metal azides and aluminum trialkyls are separated from the rest of the organic compounds by distillation.

27. The method of claim 22, wherein an excess of aluminum trialkyl is present, in which the higher azide complex compounds formed are split into lower azide complex compounds and in which said lower complex compounds are again used with such mixture for the formation of higher complex compounds.

28. The method of claim 27, wherein said splitting is effected by heating at temperatures up to 150° C.

29. The method of claim 27, wherein said splitting is effected by vacuum.

30. The method of claim 27, wherein said splitting is effected by extraction with a non-aromatic hydrocarbon.

31. The method of claim 22, in which the amount of azide present yields the lower azide complexes in which the latter are split into alkali azides and aluminum trialkyls and in which said alkali metal azides are again used for complexing with such mixture.

32. The method of claim 31, wherein said splitting is effected at temperatures up to 150° C.

33. The method of claim 31, wherein said splitting is effected under vacuum.

34. The method of claim 31, wherein said splitting is effected by extraction with a non-aromatic hydrocarbon.

35. The method of claim 24, wherein all of the olefins up to and including $C_{10}$ are removed by distillation prior to the complex formation.

36. The method of claim 24, wherein the product to be separated is separated by distillation into a fraction containing lower olefins up to and including $C_{10}$, a second fraction containing dodecene-aluminum triethyl, and a third fraction containing higher olefins, and in which only the second fraction is treated with azides.

37. A cyclic process for the production of alpha-olefins according to claim 24, which comprises preparing higher aluminum trialkyls by subjecting lower aluminum trialkyls and ethylene to the growth reaction; displacing from said higher aluminum trialkyls the higher alpha-olefins by means of lower olefins; treating the resultant displacement products with alkali metal azides; separating the complex compounds from the olefins; splitting the complex compounds and reusing the resultant alkali metal azides for complexing and the resultant aluminum triethyl for the growth reaction.

38. The method of claim 37, wherein said displacement is effected in the presence of nickel compounds as the catalysts.

39. The method of claim 37, wherein lower azide complexes in place of said alkali azides are used for the complex formation and the higher complexes are only partially split to the lower alkali metal azide complexes.

40. The method of claim 22, wherein mixtures of aluminum trialkyls with lead tetraalkyls are separated.

41. The method of claim 22 in which mixtures of aluminum trialkyls with boron alkyls are separated.

42. The method of claim 41 in which said aluminum trialkyls and said boron alkyls are normal liquid lower alkyl compounds.

References Cited

UNITED STATES PATENTS

| | | | |
|---|---|---|---|
| 2,863,896 | 12/1958 | Johnson | 260—448 |
| 2,889,385 | 6/1959 | Caterall et al. | 260—448 |
| 3,098,862 | 7/1963 | Kobetz | 260—448 |

TOBIAS E. LEVOW, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,208

October 15, 1968

Bruno Blaser et al.

It is certified that error appears in the above identified patent and that said Letters Patent are hereby corrected as shown below:

Column 11, line 70, before "B.P." insert an opening parenthesis; same line 70, "0.5" should read -- 0.05 --. Column 14, line 30, "hralides" should read -- halides --.

Signed and sealed this 3rd day of March 1970.

(SEAL)
Attest:

Edward M. Fletcher, Jr.
Attesting Officer

WILLIAM E. SCHUYLER, JR.
Commissioner of Patents